United States Patent
Zhong et al.

(10) Patent No.: US 12,095,981 B2
(45) Date of Patent: Sep. 17, 2024

(54) VISUAL LOSSLESS IMAGE/VIDEO FIXED-RATE COMPRESSION

(71) Applicant: VeriSilicon Holdings Co., Ltd., Grand Cayman (KY)

(72) Inventors: Lefan Zhong, San Jose, CA (US); Mankit Lo, Fremont, CA (US); Wei Miao, Shanghai (CN)

(73) Assignees: VeriSilicon Microelectronics (Shanghai) Co., Ltd., Shanghai (CN); VeriSilicon Holdings Co., Ltd., Grand Caymen (KY)

( * ) Notice: Subject to any disclaimer, the term of this patent is extended or adjusted under 35 U.S.C. 154(b) by 51 days.

(21) Appl. No.: 18/103,477

(22) Filed: Jan. 30, 2023

(65) Prior Publication Data
US 2023/0262210 A1 Aug. 17, 2023

Related U.S. Application Data (60) Provisional application No. 63/303,997, filed on Jan. 28, 2022.

(51) Int. Cl.
| | | |
|---|---|---|
| H04N 7/12 | (2006.01) | |
| H04N 19/103 | (2014.01) | |
| H04N 19/12 | (2014.01) | |
| H04N 19/124 | (2014.01) | |
| H04N 19/182 | (2014.01) | |

(52) U.S. Cl.
CPC ........... *H04N 19/103* (2014.11); *H04N 19/12* (2014.11); *H04N 19/124* (2014.11); *H04N 19/182* (2014.11)

(58) Field of Classification Search
CPC ...................................................... H04N 19/12
See application file for complete search history.

(56) References Cited

U.S. PATENT DOCUMENTS 8,577,164 B2 * 11/2013 Strom ................... H04N 19/176
382/243

* cited by examiner

*Primary Examiner* — Y Lee
(74) *Attorney, Agent, or Firm* — IPRTOP LLC (57) ABSTRACT

A data compression method is provided for compressing an image. A coding module may select a plurality of pixels with a sequence order from the image, and compress the plurality of pixels to generate a plurality of compressed pixels. For a current pixel p[i] having a previous pixel p[i−1] and a next pixel p[i+1], the coding module generates a coding mode M[i+1] configured for compressing the p[i+1], and generates a fixed-rate compressed value c[i] corresponding to the p[i]. The coding module stores the c[i] in a compressed pixel, and c[i] encapsulates the coding mode M[i+1]. The coding module then stores the plurality of compressed pixels into a compressed image corresponding to the image.

20 Claims, 7 Drawing Sheets

VISUAL LOSSLESS IMAGE/VIDEO FIXED-RATE COMPRESSION

CROSS REFERENCE TO RELATED APPLICATION

The present application is a US non-provisional application claiming the benefit of priority to a U.S. provisional application No. 63/303,997, filed on Jan. 28, 2022 and entitled "VISUAL LOSSLESS IMAGE/VIDEO FIXED RATE COMPRESSION", the contents of which is incorporated herein by reference in their entireties for all purposes.

FIELD OF TECHNOLOGY

The present disclosure generally relates to image processing, and in particular, to a coding module utilizing visual lossless image/video fixed rate compression techniques.

BACKGROUND

Displays for high-end smartphones, automotive infotainment systems, and augmented reality (AR)/virtual reality (VR) devices are becoming more sophisticated with quad HD or 4K resolutions at faster frame rates and support for RGB formats. This evolution has introduced new challenges for designers—managing the required data bandwidth while reducing power consumption and without compromising visual quality. Visually lossless compression helps to increase the data rate when the displays of ultra-high quality are compressed to reduce bandwidth.

If the compression distortions are invisible, the compression is said to be visually lossless. If, however, the compression distortions are visible, the compression is called visually lossy. Both of these paradigms fall under the more general category of the so-called perceptual coding, owing to the need to model the human visual system (HVS). However, current perceptual coding techniques have several shortcomings, such as significant noise, color tune change, and banding artifacts.

SUMMARY

The present disclosure provides a robust coding module for visual lossless fixed-rate compression/decompression of images or videos. The coding module may select a plurality of pixels with a sequence order from an image, and compress the plurality of pixels to generate a plurality of compressed pixels. For a current pixel p[i] having a previous pixel [i−1] and a next pixel p[i+1], the coding module generates a coding mode M[i+1] configured for compressing the p[i+1], and generates a fixed-rate compressed value c[i] corresponding to the p[i]. The coding module stores the c[i] in a compressed pixel, and c[i] encapsulates the coding mode M[i+1]. The coding module then stores the plurality of compressed pixels into a compressed image corresponding to the image.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 1:
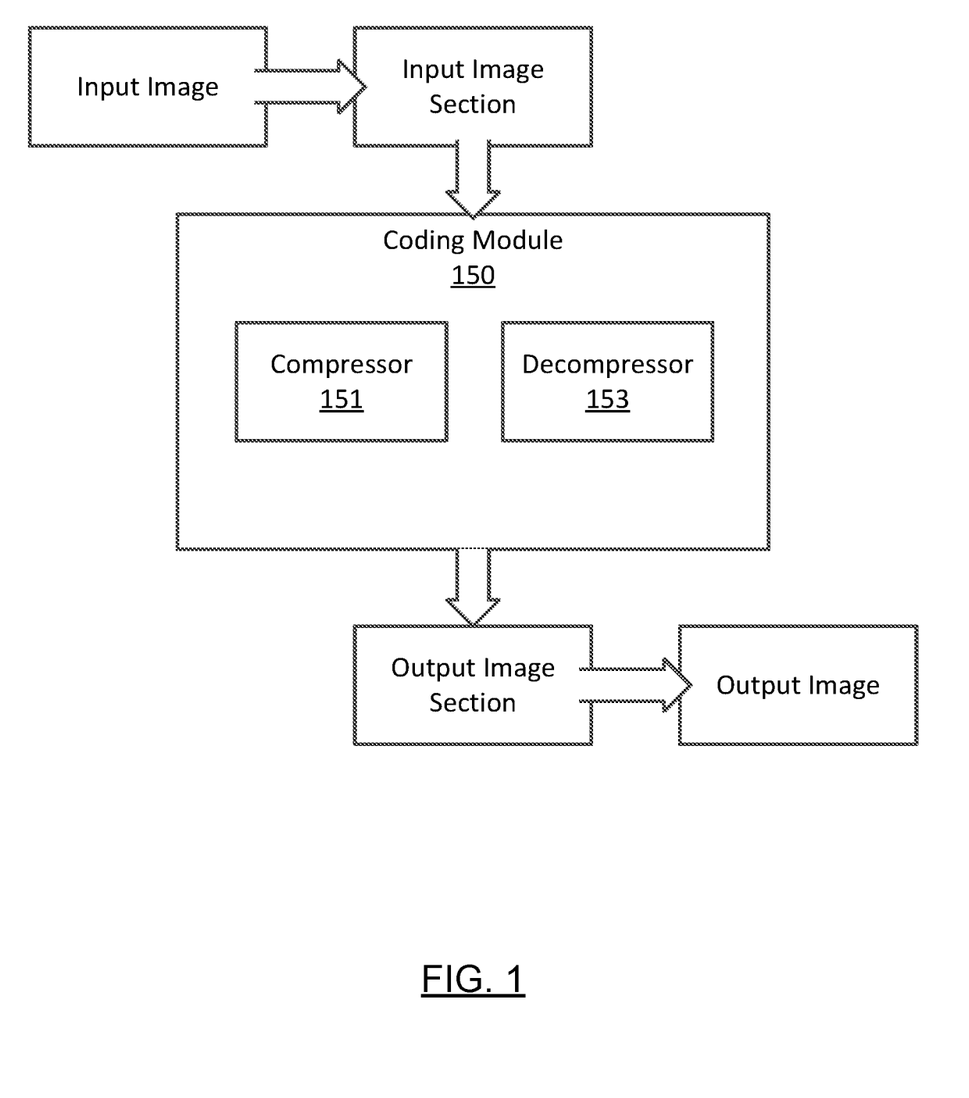
FIG. 1 shows a diagram illustrating a coding module for processing an input image, according to some embodiments of the present disclosure.

FIG. 1 shows a diagram illustrating a coding module for processing an input image, according to certain embodiments of the present disclosure. The coding module 150 may receive, from an external source, an input image, perform certain coding operations on the input image, generate an output image based on the input image, and transmit the output image to the external source as a response to the receiving of the input image. Specifically, the coding module 150 may divide the input image into a set of input image sections, and process these multiple input image sections either individually, sequentially, or simultaneously, in order to generate a corresponding set of output image sections. The coding module 150 may then generate an output image based on the set of output image sections.

In some embodiments, the coding operations performed by the coding module 150 may be any data manipulating or adjusting operations, including without limitations, compressing, decompressing, quantizing, dequantizing, translating, truncating, extrapolating, etc. In some embodiments, the coding module 150 may include a compressor 151 configured to compress an input image and generate a compressed image corresponding to the input image. Further, the coding module 150 may include a decompressor 153 configured to decompress a previously compressed image and generate a decompressed image corresponding to the previously compressed image.

In some embodiments, for each input image section, the coding module 150 may perform pixel-by-pixel processing to generate the corresponding output image section. For example, when compressing an input image section, the coding module 150 may utilize the compressor 151 to compress each of the pixels contained in an original input image section one by one, and generate one-by-one a corresponding compressed pixels to be stored into the compressed output image section. Further, the coding module 150 may utilize the decompressor 153 to decompress each of the pixels in a compressed input image section, and generate a corresponding uncompressed pixel to be stored into the uncompressed output image section.

In some embodiments, the coding module 150 provides a fixed-rate compressing/uncompressing of the image data. Specifically, the coding module 150 does not utilize a variable-rate processing of the image data, such as Huffman coding. A variable-rate processing of the image implies that there can be a large variation in the number of bits generated when compressing pixels, depending on the content of the image. Thus, variable-rate compressing means the memory of the device might overflow and that the data cannot be transmitted in a fixed time. In fixed-rate compressing or decompressing, the memory footprints required by each pixel are predefined and consistent. For example, when the coding module 150 provides a fixed-rate compression, the compression or decompression process may be greatly simplified.

In some embodiments, the coding module 150 may pre-configure a predefined specific rate for the compression, and such rate may be fixed throughout the subsequent compression and decompression of the image data. For example, the coding module 150 may configure a predefined rate of (2:1) compression, so that a 8-bit uncompressed pixel may be compressed to a 4-bit compressed pixel. In this approach, each pixel in the original image may be 8-bit, and each pixel in the compressed image may be 4-bit. Alternatively, the coding module 150 may define a rate of compression that can compress a pixel with X bits to a compressed pixel with Y bits, X>Y>0.

In some embodiments, the coding module 150 may compress an initial pixel in an image section with an initial compression rate that is different from the main compression rate for the rest of pixels in the image section. This compression scheme may still be deemed a fixed-rate compression, as long as the initial compression rate and the main compression rate are predefined and fixed for subsequent compression of all other pixels in the image and for decompression.

In some embodiments, the coding module 150 may process the input image channel-by-channel, and generate the output image channel-by-channel. A channel may refer to a certain component of an image that is used to store information related to the image. For example, a RGB formatted image may contain three channels: red, green, and blue. For a 24-bit RGB image, each of the R, G, and B channels may have 8 bits pixels. In other words, this 24-bit RDB image may be deemed composing of three images (one for each channel), and each image may store discrete 8-bit pixels with pixel values ranging from 0 to 255 to represent brightness intensities. After compression, the 8-bits per pixel per channel may be compressed to 4-bits per pixel per channel. The above approach may be applicable to other image formats such as YUV.

In some embodiments, the coding module 150 provides a visual-lossless compressing/uncompressing of the image data. A compressed image may be deemed "visually lossless" when its corresponding decompressed image stays reasonably close to the original image, containing all the sharp edges, trends, and color tone of the original image, and introducing no banding artifacts, no significant noise, and no flickering when being displayed. In other words, a human may not detect any differences (or losses) when visually comparing an original image with a reconstructed image that is first compressed and then decompressed using a visually lossless process. And the reconstructed image may be used for further enlargement/enhancement.

In some embodiments, the coding module 150 provides the visual-lossless capability based on the fact that human eyes may not be sensitive to 4-bits error in "busy" areas of an image. For example, boundary areas of two objects in the image may be deemed busy. However, human eyes are able to notice slowly changing trends, patterns, color tones of certain areas, and any flickering in a video. Thus, for "busy" pixels (pixels that change a lot compared to their adjacent pixels) and for "flat" pixels (pixels that have no changes or change slightly compared to their adjacent pixels), the coding module 150 may utilize different code modes for compression/decompression.

In some embodiments, the coding module 150 may utilize a raw coding mode (or coding method) to process the busy pixels, and a differential coding mode to process the flat pixels. Specifically, in raw coding mode, truncation and/or quantization may be used to perform compression. For example, Block Truncation Coding (BTC), which is a fixed-length compression mechanism, may be used as a quantizer to compress the busy pixels. For flat pixels, simple truncation may not provide sufficient visual-lossless for human eyes. In this case, the coding module 150 may utilize a differential coding mode that is based on a difference between the pixel that is currently being processed and its adjacent pixels. Since for flat pixels, changes between themselves and the adjacent pixels are relatively small, the coding module 150 may use the differential coding mode to encode the changes with relatively high accuracy, therefore achieving visually lossless compression.

In some embodiments, the coding module 150 may process the input image pixel-b-pixel, determine whether the pixel currently being processed (current pixel) is deemed a busy pixel or a flat pixel, and dynamically assign a raw coding mode or a differential code mode to the process, either when processing the current pixel or when processing the previous pixel. Thus, the coding module 150 may determine whether to maintain its current coding mode or to dynamically switch to a different coding mode when processing through a set of pixels one-by-one.

In some embodiments, the coding modes that are utilized by the coding module 150 for compressing a set of input pixels to a set of compressed pixels, may need to be preserved in the set of compressed pixels, so that the decompressor 153 of the coding module 150 may be able to properly perform decompression by extracting these coding modes from the compressed pixels. In some cases, a coding mode may be preserved in a compressed pixel by reserving one or more dedicated bit(s) in the compressed pixel for storing the coding mode, and using the rest of bits to store the compressed pixel value. In other cases, the coding mode may be encapsulated into the value of the compressed pixel, without reserving any dedicated bits in the compressed pixel for storing the coding mode. The "encapsulation" operation allows the coding mode to be indirectly derived from the compressed pixel value, without actually storing the coding mode in the compressed pixel value.

In some embodiments, when decompressing, the coding module 150 may derive the coding mode from the compressed pixel during generating uncompressed pixel based on the compressed pixel. In other words, in a line of pixels retrieved from the input image, some pixels may be "busy" and some may be "flat". The coding module 150 may encode or encapsulate such busy or flat information (represented by the coding mode) into the 4 bits reserved for each pixel during compression, and extract the coding mode (with the implicit busy or flat information) from the 4-bit compressed pixel during decompression.

In some embodiments, the coding module 150 may compress/decompress each of the input image sections independently and/or simultaneously. Specifically, when processing one input image section to generate one output image section, the coding module does not need to process or access any other input image sections or output image sections. Therefore, the coding module 150 may divide an input image into multiple input image sections, and pick and choose to process these input image sections in any order or fashion. For example, the coding module 150 may choose to process some or all of the input image sections sequentially, horizontally, vertically, diagonally, randomly, or in any order. The coding module 150 may also concurrently process some of the input image sections in parallel.

In some embodiments, the input image may be generated by an image-capturing device such as camera or video recorder. The input image may also be a frame extracted from a video, or a slice, macro-block, or sub-block of a video. The coding module 100 may be implemented in a server, client, computer, smart phone, smart watch, or any other physical computing device, chip, or electronic module.

Figure 2A:
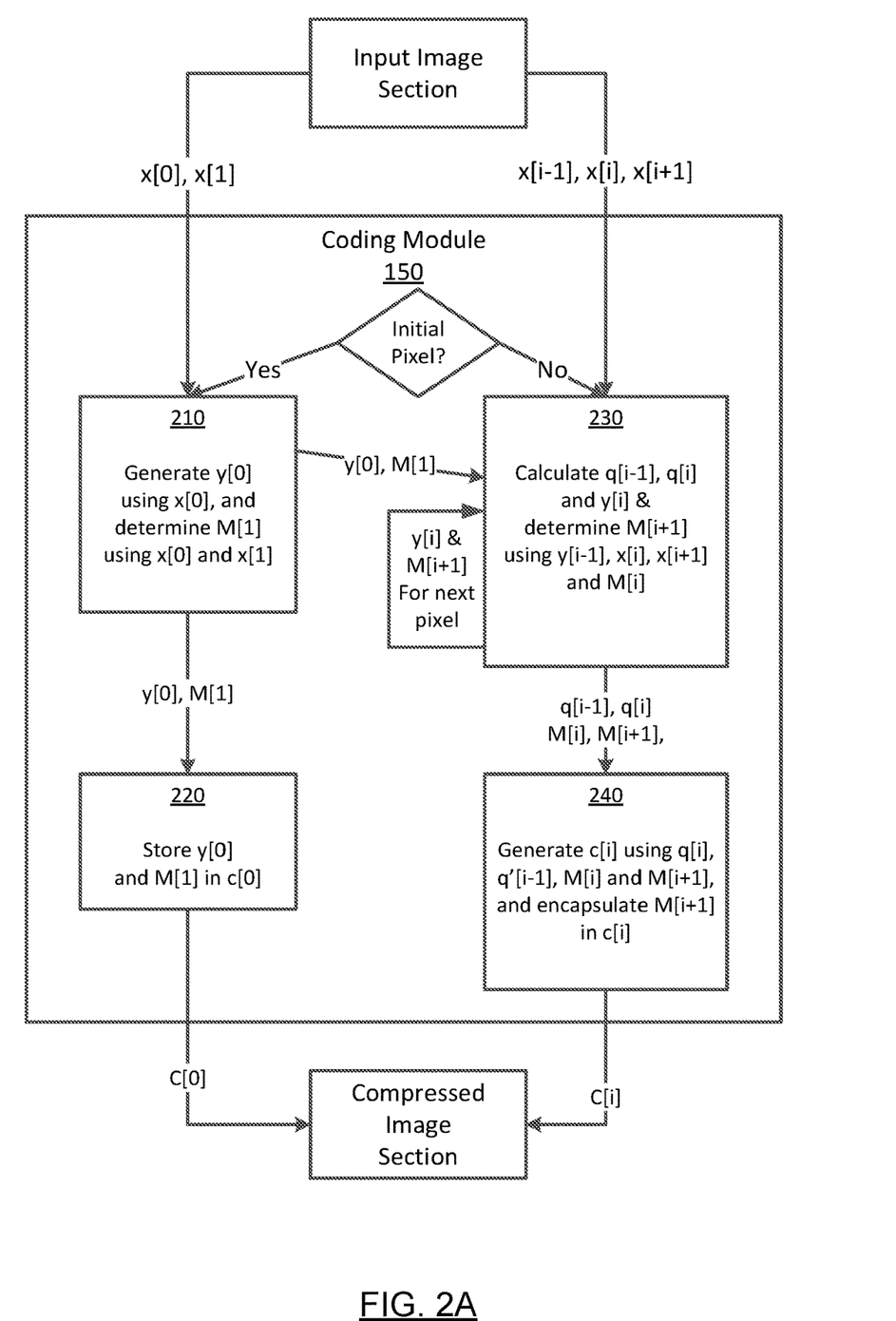
FIG. 2A shows a process flow for compressing an input image, according to some embodiments of the present disclosure.

FIG. 2A shows a process and data flow for compressing an input image, according to certain embodiments of the present disclosure. In FIG. 2A, a coding module 150 may receive an image section as an input, process the image section, and generate a compressed image section.

In some embodiments, the coding module 150 may be configured to perform line-by-line (or line-based) compression of an input image, and each input image section may represent a line (or a section of line) in an input image. The "line" may be a one-dimensional horizontal or vertical array of pixels from the input image. The coding module 150 may also be configured to perform block-by-block (or block-based) compression of an image. The block may be a 2-D block or tile of pixels in the input image. The coding module may arrange the pixels from the line or block into the image section based on a specific sequential order. "Sequential order" may be an ascending or descending order indicating the locations of the pixels in the image section with respect to themselves. In order words, when two pixels are adjacent in the image section based on the sequential order, these two pixels are adjacent to each other in the input image.

In some embodiments, to process a 2-D block of pixels, the coding module may transform the 2-D block into an 1-D array. For example, for a 4×4 block of pixels as shown below:

(0, 0), (0, 1), (0, 2), (0, 3);
(1, 3), (1, 2), (1, 1), (1, 0);
(2, 0), (2, 1), (2, 2), (2, 3);
(3, 3), (3, 2), (3, 1), (3, 0).

The coding module may transfer these pixels into a 1-D 16-pixel line:

(0, 0), (0, 1), (0, 2), (0, 3), (1, 3), (1, 2), (1, 1), (1, 0), (2, 0), (2, 1), (2, 2), (2, 3), (3, 3), (3, 2), (3, 1), (3, 0).

Therefore, the line-based processing of the image may be applicable to blocks of pixels.

For illustrative purposes, each image section may contain N number of pixels, N>1, and a specific pixel in the image section may be referred to as p[i], with i being an integer ranging from 0 to N−1. The first pixel in the image section may be referred to as an "initial pixel" or p[0]. When p[i] is deemed a "current pixel", a "previous pixel" of p[i], which may be the pixel that is adjacent to p[i] and located before p[i] based on the sequential order, may be denoted p[i−1].

And a "next (subsequent) pixel" of p[i], which may be the pixel that is adjacent to and located after p[i] based on the sequential order, may be denoted p[i+1]. Thus, the last pixel may be denoted p[N−1].

In some embodiments, the coding module may compress the input image section pixel-by-pixel based on the sequential order. Specifically, in each round of processing, the coding module may sequentially retrieve from the image section one pixel as the current pixel, starting from p[0] and all the way to p[N−1]. The compressed image section may contain an array of compressed pixels with the same sequential order as the input image section, with each compressed pixel at location i corresponding to one uncompressed pixel in the input image section at the same location i. Therefore, the above approach is suitable for stream-processing, the input image section may be implemented as a bitstream in the memory, and the coding module may retrieve and process the pixels as they become available in the bitstream.

In some embodiments, the coding module may perform its compression operation based on a pixel's raw value. Assuming the input channel range is from 0~239. For any 8-bit full range (0~255) channel, the coding module may scale the image data to the range of 0~239. Therefore, each pixel in the input image section may have a raw value ranging from 0 to 239. The pixel p[i]'s raw value may be denoted x[i] hereinafter. For illustrative purposes, the compressed pixel value corresponding to pixel p[i] may be denoted c[i], which may be stored in the compressed image section. For example, the x[i] for p[i] may be a 8-bit value with a range of 0~239, and its correspond c[i] may be a 4-bit value having 16 values.

In some embodiments, the coding module may dynamically determine or switch coding modes when processing the pixels. Specifically, the code method determined for the current pixel p[i] may be denoted M[i], with its value being either RAW_C or DIF_C. RAW_C refers to a raw coding mode, in which the current pixel p[i] is coded based on p[i]'s raw value x[i] (e.g., coding by truncation). DIF_C refers to a differential coding mode, where the current pixel p[i] may be coded from a difference between the predict value y[i] and the raw value x[i].

In some embodiments, the coding module may generate various intermediate values corresponding a pixel p[i]. Specifically, for a pixel p[i], a "quantized value" may be denoted q[i], which may be generated by performing quantization based on a specific value associated with p[i]. A "predict value" may be denoted y[i], which may be generated by performing a decoding or decompressing on an encoded or compressed value. In certain situations, the predict value y[i] may be obtained by decompressing a value that is generated from compressing x[i]. For example, as shown by the following pseudo code:

y[i] = When M[i] == RAW_C? x[i]/16*16+8: y[i−1] + Approx(x[i] − y[i−1])
Approx(Diff) = One of {±24, ±12, ±6, ±3, ±1,0} // closest to the value Diff.

In the above example code, when the coding mode is RAW_C, y[i] is calculated based on the current pixel's raw value x[i]. When the coding mode is not RAW_C (i.e., in DIF_C), y[i] may be generated based on previous pixel's predict value y[i−1], plus an approximated difference between the previous pixel's predict value y[i−1] and the current pixel raw value x[i].

In some embodiments, the coding module may determine whether the current pixel to be process is an initial pixel, and if so, the coding module may proceed to blocks 210 and 220 for generating and storing the compressed initial pixel (or initial compressed pixel). Specifically, the coding module may compress the initial pixel p[0] using RAW_C, since p[0] does not have a previous pixel. During the compressing of p[0], the coding module may further determine a coding mode M[1] for the next pixel p[1], and store M[1] into a dedicated bit in the compressed pixel c[0].

In some embodiments, the initial compressed pixel c[0] may have 8 bits, with 7 bits dedicated for the storing of the compressed pixel value c[0], and 1 bit dedicated for the storing of M[1] for the next pixel. The above operations may be shown by the following pseudo code:

```
y[0] = x[0]/2*2,
M[1] = Abs(x[1] − (x[1]/16*16 + 8)) < Abs(x[1] − (y[0] +
    Approx(x[1] − y[0]))) ? RAW_C:
    DIF_C
```

In the above example code, the predict value y[0] may be generated based on x[0] and stored into the dedicated 7 bits in the compressed pixel for p[0]. And M[1] may be generated by determining whether the next pixel is busy or flat. If the next pixel is deemed busy, M[1] is set to be in RAW_C. If the next pixel is deemed flat, M[1] is set to be in DIF_C. Once M[1] is determined, it may be stored into the dedicated 1 bit in the compressed pixel for p[0]. Afterward, y[0] and M[1] may then be transmitted to block 230 for subsequent compressing of non-initial pixels.

In some embodiments, when the current pixel p[i] is not the initial pixel, the coding module may proceed to blocks 230 and 240 for pixel-by-pixel processing. Specifically, for each p[i], the coding module may generate a compressed value c[i] and a corresponding M[i+1] for the next pixel. For the last pixel, the coding module may extrapolate an additional pixel that is substantially the same as the last pixel, and treat the last pixel as have a next pixel fulfilled by the extrapolated pixel. Alternatively, the coding module may skip the generating of M[i+1] for the last pixel. Further, the coding module needs to generate c[i] that encapsulates M[i], i=1~N−1.

In some embodiments, the coding module may determine the coding mode M[i] for p[i[based on the following pseudo code:

```
M[i] = Abs(x[i] − (x[i]/16*16 + 8)) < Abs(x[i] − (y[i−1] +
    Approx(x[i] − y[i−1]))) ? RAW_C:
    DIF_C
```

In the above code, the coding module may calculate a "raw-coding cost" based on an absolute difference between a raw value x[i] and a predict value y[i]=x[i]/16*16+8. The coding module may further calculate a "diff-coding cost" based on an absolute difference between a raw value x[i] and a predict value y[i]=y[i−1]+Approx(x[i]−y[i−1]). If the raw-coding cost is smaller than the diff-coding cost, the M[i] may be set to be RAW_C. If the raw-coding cost is not smaller (equal or higher) than the diff-coding cost, the M[i] may be set to be DIF_C. However, during decoding/decompressing, the coding module may not have the information of x[i], so it cannot regenerate M[i], unless M[i] is stored in the compressed pixel and occupies 1 bit per pixel. This extra 1 bit per pixel is highly costly, since only 4 bits are reserved for each compressed pixel in this embodiment.

In some embodiments, the coding module may calculate coding mode M[i+1] based on the y[i] and y[i−1] values. Since y[i] and y[i−1] may be preserved in the compressed pixels, the coding module may extract the y[i] and y[i−1] information from the compressed pixels, and generated a corresponding M[i+1] for decompression.

In some embodiments, block 230 shows a general approach to determine whether p[i+1] is busy or flat may include: quantizing the predict value of p[i] and the predict value of p[i+1] to get q(i) and q(i+1); and comparing q[i] and q[i+1]. In some embodiments, if the quantized values are not equal, or if p[i] is in an edge area of the image, then p[i+1] may be deemed in a busy area of the image. Further, if the current pixel p[i] is busy, then the coding module may assume that the next pixel p[i+1] may also be busy. Alternatively, if the current pixel p[i] and the previous pixel p[i−1] have substantially the same value (after quantization), it is assumed that the next pixel p[i+1] is flat. Block 230 is further described by the following disclosure.

In some embodiments, when M[i] is RAW_C, indicating the previous pixel p[i−1] is busy, the coding module may determine that M[i+1] is RAW_C if y[i] is not substantially equal (e.g., with a difference no larger than a predefined range, such as +/−1) to y[i−1], as shown in the following example pseudo code:

```
If (M[i] == RAW_C) and (y[i−1]/16 != y[i]/16)
    M[i+1] = RAW_C;
```

In some embodiments, when M[i] is RAW_C and if y[i] is substantially equal to y[i−1], the coding module may determine M[i+1] as shown by the following example pseudo code:

```
If( Abs(x[i+1] − (x[i+1]/16*16 + 8)) < Abs(x[i+1] − (y[i] +
    Approx(x[i+1] − y[i]))) {
    M[i+1] = RAW_C;
    c[i] = y[i]/16; //The value is from 0~14, as x[i] < 240 }
Else{
    M[i+1] = DIF_C;
    c[i] = 0x0F; //Escape, meaning y[i] = y[i−1]/16*16+8 }
```

In the above code, the coding module may compare a "mode-changing cost" with a "mode-sustaining cost", and setting M[i+1] to RAW_C (i.e., no mode changing) when mode-sustaining cost is lower, or setting M[i+1] to DIF_C (i.e., changing mode from RAW_C to DIF_C) when mode-changing cost is lower.

In the above code, the mode-changing cost may be determined based on a difference between x[i+1] and an approximated difference of x[i+1] and y[i], as shown in Abs(x[i+1]−(y[i]+Approx(x[i+1]−y[i]). And the mode-sustaining cost may be determined based on x[i+1], as shown in Abs(x[i+1]−(x[i+1]/16*16+8)). Note that the above calculation uses quantization/dequantization factors such as "8" or "16", which provides optimal results for compressing 8-bit pixel in [0~240] range to 4-bit data and decompressing back to 8-bit data, other factors may also be used.

In the above case, when the coding module determines no mode-changing, the compressed 4-bit value c[i] for p[i], which is generated based on the y[i], may have a value from 0~14. When the coding module determines mode-changing, the compressed 4-bit value c[i] may have a single escape value. "Escape value" may refer to certain compressed value that is encapsulated with coding mode. In this case, the escape value 0x0F may also be used to indicate mode-changing and M[i+1] being DIF_C. Thus, without dedicating a bit to store the M[i+1] in the compressed 4-bit value c[i], the coding module may nevertheless determine M[i+1] based on the escape values.

In some embodiments, when M[i] is DIF_C, indicating the previous pixel p[i−1] is flat, the coding module may determine that M[i+1] as shown in the following example pseudo code:

```
ApproxDiff[i] = Approx(x[i] − y[i − 1]);
Addup = Abs(ApproxDiff[i]) == {24 or 12} ? 0: Abs(Approx(i)) ;
If(Abs(x[i+1] − (x[i+1]/16*16 + 8)) + Addup < Abs(x[i+1] −
(y[i]+Approx(x[i+1] − y[i])))
{ // second mode-change cost is compared with second mode-sustaining
cost
    M[i+1] = RAW_C;
    Adjust(ApproxDiff[i]) = Abs(ApproxDiff[i]) == {24 or 12}?
ApproxDiff[i]:0.
    y[i] = y[i−1] + Adjust(ApproxDiff[i]);
    c[i] = EscapeCodeAt (Adjust(ApproxDiff[i])) }
Else{
    M[i+1] = DIF_C;
    c[i] = DirectCodeAt(ApproxDiff(i)); }
```

In the above code, the coding module may compare a "mode-changing cost" with a "mode-sustaining cost", and setting M[i+1] to DIF_C (i.e., no mode changing) when mode-sustaining cost is lower, or setting M[i+1] to RAW_C (i.e., changing mode from DIF_C to RAW_C) when mode-changing cost is lower.

In the above code, the mode-changing cost may be determined by x[i+1] and an addup value based on x[i] and y[i−1], as shown in (Abs(x[i+1]−(x[i+1]/16*16+8))+Addup. And the mode-sustaining cost may be determined based on x[i+1] and y[i], as shown in Abs(x[i+1]−(y[i]+Approx(x[i+1]−y[i]))). Note that the above calculation uses quantization/dequantization factors such as "8" or "16" and addup factors such as "12" or "24", which provides optimal results for compressing 8-bit pixel in [0~240] range to 4-bit data and decompressing back to 8-bit data, other factors may also be used.

In the above case, when the coding module determines no mode-changing, the compressed 4-bit value c[i] for p[i], which is generated based on an approximated difference between x[i] and y[i−1] under the DIF_C, as shown in c[i]=DirectCodeAt(ApproxDiff[i]).

In some embodiments, when the coding module determines mode-changing, the compressed 4-bit value c[i] may be calculated based on an adjusted approximate difference between y[i] and y[i−1], as shown by c[i]=EscapeCodeAt-Adjust(ApproxDiff[i]). In other words, c[i] may have a set of escape values which are encapsulated with the coding mode. In this case, the escape values may also be used to indicating mode-changing and M[i+1] being RAW_C. Thus, without dedicating a bit to store the M[i+1] in the compressed 4-bit value c[i], the coding module may nevertheless determine M[i+1] based on the escape values.

In some embodiments, when M[i] is DIF_C, for a 4-bit c[i], its values of may have 11 values {±21, ±14, ±9, ±4, ±1, 0} when there is no mode-changing for the next pixel, and may have 5 escape values, indicating mode-changing for the next pixel. In other words, for the 16 values c[i] may have, 11 values may be used to encode/compress ApproxDiff[i] and encapsulate no mode-changing and coding mode being DIF_C, and 5 values, which is generated by quantizing ApproxDiff[i] to Adjust(ApproxDiff[i])), may be used to encapsulate mode-changing and coding mode being RAW_C.

Therefore, the above approach is fixed-rate, as for an image section having N 8-bit pixels, the compressed pixels may have a fixed size of 8+4*(N−1), in which the initial pixel takes 8 bits and the rest of pixels take 4 bits/pixel after compression. Further the above approach encapsulates the coding mode and mode-changing in the 4-bit compressed value, without dedicating 1 bit to store such mode information. Such an approach can achieve almost 2-to-1 compression, which greatly reduced the resources required during compression/decompression process.

In some embodiments, the coding module may further enhance the above compression process when the coding mode is changed from RAW_C to DIF_C. As shown in the previous approach, M[i+1] may be changed from RAW_C to DIF_C when y[i]=y[i−1]. For an example image section having pixel values such as {0, 63, 64, 63, 64, 63, 64 . . . }, the corresponding area of the image section is almost flat with ±1 changes. However, based on the code provided above, |y[i]/16−y[i+1]/16|=1, and therefore the decoded results may be {0, 56, 72, 56, 72 . . . }, which is not flat in comparison to the original pixels, meaning the decoded results may not be sufficiently visually lossless.

To enhance the above situation, the coding module may not scale the pixels to 0~239 range, in order to make the decoded results visually lossless. Thus, under the M[i] being RAW_C situation, y[i] may be calculated using (x[i]+11+4)/22*22−4, then there may be 13 quantized values and 3 escape values. In other words, when Quan(y[i])−Quan(y[i−1]) is 0 or ±1 escape values, the coding module may allow mode-changing to DIF_C. Specifically, the above quantize calculation Quan(s)=(s+11+4)/22 may applicable for any s value in the range of 0~12. For any value t in the range of 0~2, a dequantization calculation DeQuan(t)=t==0? 0: (t==12? 255:22*t−4).

Further, when M[i] is RAW_C and M[i+1] is DIF_C, the escape value may be 13, 14, 15. The y[i] value may be determined by referencing to y[i−1] under the following codes:
    DeQuan(13)=DeQuan(Quan(y[i−1])−1);
    DeQuan(14)=DeQuan(Quan(y[i−1])+1);
    DeQuan(15)=DeQuan(Quan(y[i−1])).

In the enhanced embodiments, when M[i] is DIF_C, the coding module may quantize the difference d[i]=x[i]−y[i] to one of {±21, ±14, ±9, ±4, ±1,0}, and determine M[i+1] based on the following definitions:
    QuanDiffEdge[6]={0, 2, 6, 11, 17, 255}
    DeQuanDiffValue[6]={0,1,4,9,14,21}
    QuanDiff0(d)=d≥0? k: k+5, where k is the minimum value such that |d|≤QuanDiffEdge[k]
    DeQuanDiff(k)=k<6? DeQuanDiffValue[k]: −DeQuanDiffValue[k−5], k≤10

In some embodiments, when a current pixel is coded in DIF_C and the next pixel is to be coded in RAW_C mode, there may be 5 escapes value. To optimize, the coding module may determine M[i+1] based on the following definitions:
    QuanDiffEscapeEdge[3]={7, 17, 255},
    DeQuanDiffEscapeValue[3]={0, 14, 21}
    QuanDiff1 (d)=(d≥0 or |d|≤7)? k+11: k+14, where k is the minimum value such that |d|≤QuanDiffEscapeEdge[k]
    DeQuanDiff(k)=11≤k≤14? DeQuanDiffEscapeValue[k−11]: −DeQuanDiffEscapeValue[k−13].

Based on the above definitions, the coding module may further optimize the compression process to provide better decision in choosing which mode to use for compressing or decompressing.

Figure 2B:
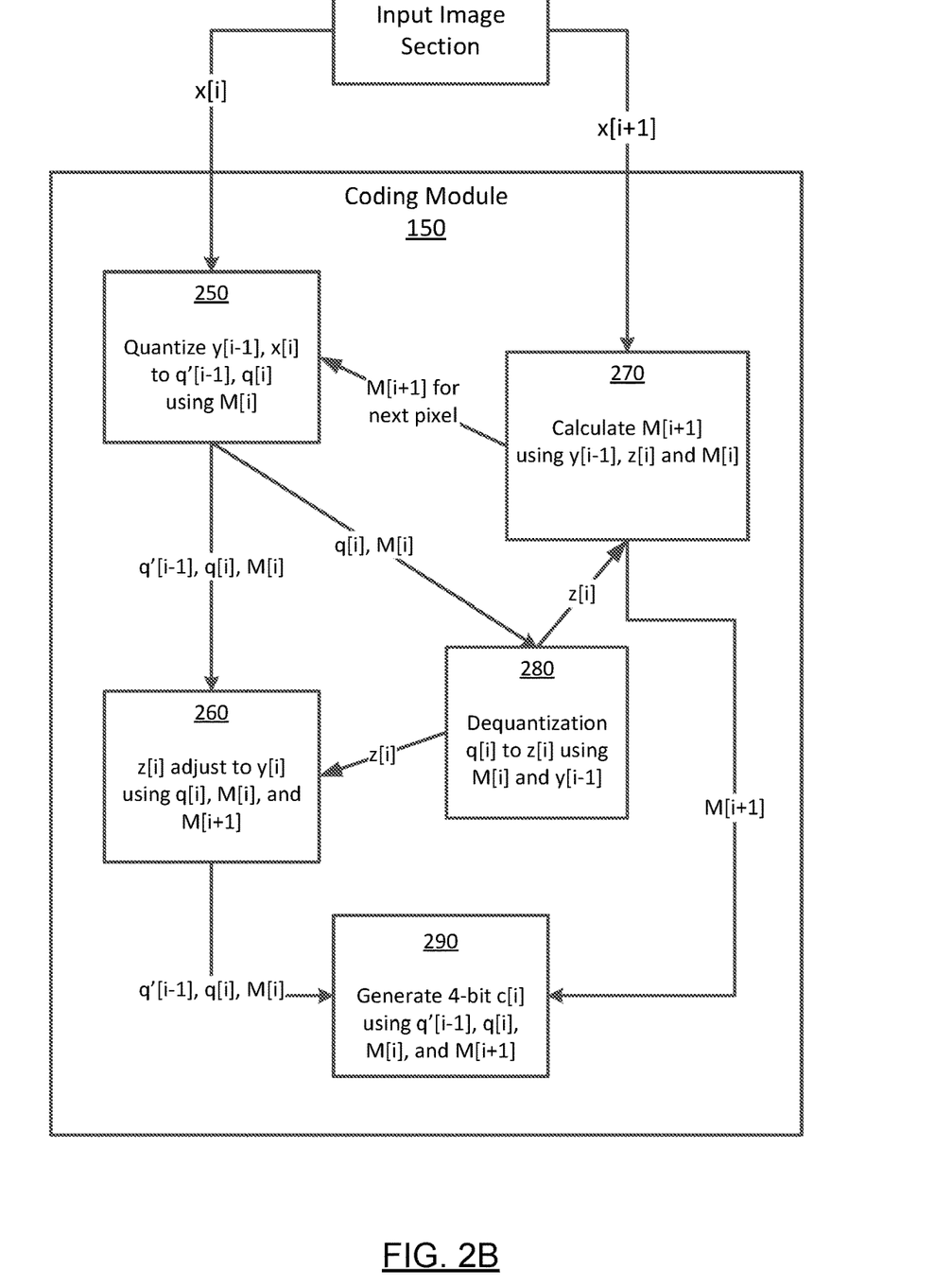
FIG. 2B shows a process and data flow for enhanced determining of coding modes in mode-switching situations, according to some embodiments of the present disclosure.

FIG. 2B shows a process and data flow for enhanced determining of coding modes in mode-switching situations, according to certain embodiments of the present disclosure. Specifically, FIG. 2B further discloses embodiments that are shown in blocks 230 and 240 of FIG. 2A. In FIG. 2B, raw values $x[i]$ and $x[i+1]$ may be retrieved from the input image section, $y[i-1]$ and $M[i]$ may be generated by blocks 250, 260, 270 and 280 and stored in cache during a previous round of compressing $p[i-1]$.

In some embodiments, in block 270, when the current mode $M[i]=RAW\_C$, the coding module may determine $M[i+1]$ based on the following code:

If $|Quan(x[i]) - Quan(y[i-1])| < 2$ and $|DequanDiff(QuanDiff0(x[i+1] - y[i])) + y[i] - x[i+1]| < |DeQuan(Quan(x[i+1])) - x[i+1]|$
   then $M[i+1] = DIF\_C$, otherwise $M[i+1] = RAW\_C$ In some embodiments, in block 270, when the current mode $M[i]=DIF\_C$, the coding module may determine $M[i+1]$ based on the following code:

$z[i] = y[i-1] + DeQuanDiff(QuanDiff0(x[i] - y[i-1]))$,
MaxErrorKeepDiff = $\max\{|DeQuanDiff(QuanDiff0(x[i] - y[i-1])) - (x[i] - y[i-1])|, |DeQuanDiff(QuanDiff0(x[i+1] - z[i])) - (x[i+1] - z[i])|\}$,
MaxErrorChange2Raw = $\max\{|DeQuanDiff(QuanDiff1(x[i] - y[i-1])) - (x[i] - y[i-1])|, |DeQuan(Quan(x[i+1])) - x[i+1]|\}$,
If MaxErrorKeepDiff ≤ MaxErrorChange2Raw
   then $M[i+1] = DIF\_C$, otherwise $M[i+1] = RAW\_C$ As shown above, $z[i]$ may be generated in block 280, $Quan(x[i])$ may be deemed $q'[i-1]$, $QuanDiff0(x[i+1]-y[i])$ may be deemed $q[i]$, and $q'[i-1]$ and $q[i]$ may be calculated in bock 250.

In some embodiments, when $M[i]=RAW\_C$ and $M[i-1]=DIF\_C$, the coding module requires an adjustment to the $q[i-1]$ calculation, and such adjustment may be denoted $q'[i-1]$. In block 250, the $q'[i-1]$ is equal to $Quan(y[i-1])$. When $M[i]=RAWC$, $q[i]$ is equal to $Quan(x[i])$. Otherwise, when $M[i]=DIF\_C$, $q[i]$ is $QuanDiff0(x[i+1]-y[i])$. In block 280, $z[i]$ is generated by $Dequan(x[i])$ when $M[i]=DIF\_C$. Otherwise, when $M[i]=RAW\_C$, $z[i]$ may be equal to $y[i]$, which is generated based on $Dequan(Quan(x[i]))$.

In the enhanced embodiments, in block 260, the coding module may modify $z[i]$ to $y[i]$ when ($M[i]=DIFF\_C$ and $M[i+1]=RAW\_C$). In that case,
$d[i]=x[i]-y[i-1]$, $d'[i]=|d[i]|\leq 7?0$: $(|d[i]|\leq 17?\pm14: \pm21)$
in the above code, "±" depends on the positive/negative of $d[i]$, and $y[i]=y[i-1]+d'[i]$. This case is similar to the following code:
   QuanDiff1 $(d)=(d\geq 0$ or $|d|\leq 7)$? $k+11$: $k+14$, where $k$ is the minimum value such that $|d|\leq QuanDiffEscapeEdge[k]$ In some embodiments, at block 290, the coding module may generate $c[i]$ based on the $q'[i-1]$, $q[i]$, $M[i]$, and $M[i+1]$. Specifically, when $M[i]=DIF\_C$ and $M[i+1]=DIF\_C$, $q[i]=QuanDiff0(d[i])$ may generate 11 values with a range of 0~10, indicating mode-sustaining. When $M[i]=DIF\_C$ and $M[i+1]=RAW\_C$, $q[i]=QuanDiff1(d[i])$ may generate 5 values with a range of 11~15. These 5 values may be deemed escape values, indicating mode-changing. Further, when $M[i]=RAW\_C$ and $M[i+1]=RAW\_C$, $q[i]=Quan(x[i])$ may generate 13 values with a range of 0~12, indicating mode-sustaining. And when $M[i]=RAW\_C$ and $M[i+1]=DIF\_C$, $q[i]$ may have 3 values 13, 14, 15. These three values may be deemed escape values indicating mode-changing.

To summarize, the above approach ensures that the pixels in the compressed image section is fixe-rated and encapsulated with coding mode that can be extracted during decompression. Further, as shown above, three pixels $p[i-1]$, $p[i]$, and $p[i+1]$ may be sufficient for the compressing of $p[i]$, and any intermediary values such as $y[i-1]$, $y[i]$, $M[i]$, $M[i+1]$, $q'[i-1]$, $q[i]$, and $z[i]$ may be derived from $x[i-1]$, $x[i]$, and $x[i+1]$. Therefore, the coding module may at most retrieve $x[i-1]$, $x[i]$, and $x[i+1]$ from the image section or bitstream, without requiring to access any additional data from the memory or cache. The coding module may further utilize temporary memory or cache to store these intermediary values for processing the current pixel, and reserve some of these intermediary values (e.g., $M[i+1]$) for subsequent round of processing the next pixel $p[i+1]$. Thus, the memory footprint required by the coding mode can be small.

In some embodiments, the coding module may utilize lookup tables (LUTs) to store routine calculations, so that the performance of the coding module can be further optimized. For example, intermediate variables $S[i]$ may be predefined or pre-calculated in the LUTs to speed up compression (or decompression). For example, the quantized values may indicate different parameters (e.g., coding modes or intermediate variables) for the corresponding pixel. When the value of $S[i]$ is within a first range, the exact value of $S[i]$ may be assigned with a specific quantized value of the pixel (e.g., from a predetermined list of quantized values in LUTs); when the value of $S[i]$ is within a second range, the exact value of $S[i]$ may indicate whether the compression mode/decompression mode of the current pixel is the same as the previous pixel, or the whether the quantized value of the current pixel is next to that of the previous pixel, or the whether the quantized value of the current pixel is smaller or larger than that of the previous pixel. Further, $QuanDiff0(d)$ and $QuanDiff1(d)$ may be implemented with LUTs to speed up calculation, and $Quan(x)$ needs addition and division (by 22) that can be quickly calculated in hardware using LUTs. Thus, compression/decompression of each pixel may be carried out with the help of LUTs.

Figure 3:
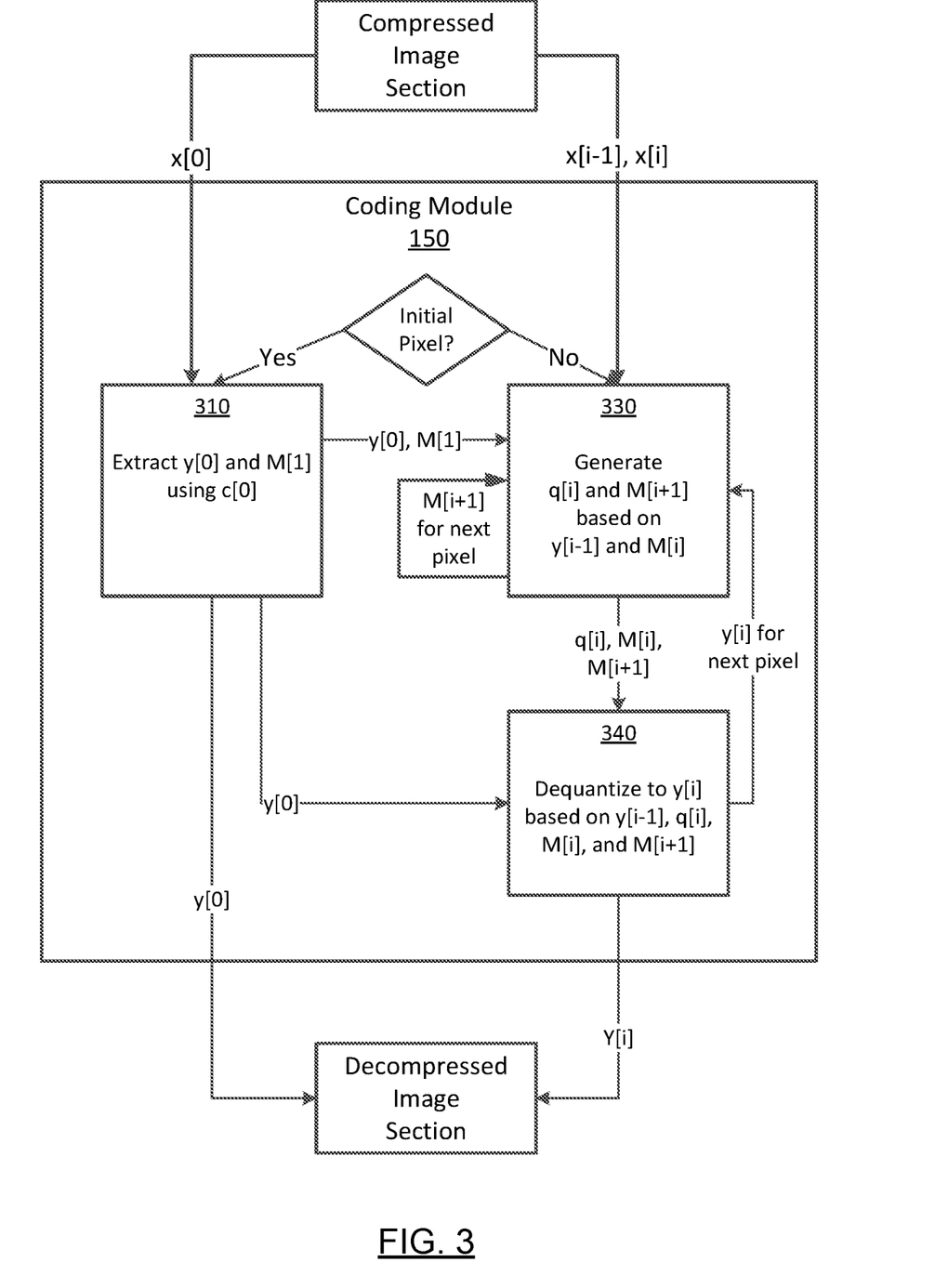
FIG. 3 shows a process and data flow for decompressing a previous compressed image, according to some embodiments of the present disclosure.

FIG. 3 shows a process and data flow for decompressing a previous compressed image, according to certain embodiments of the present disclosure. In FIG. 3, a coding module 150 may receive a compressed image section as an input, decompress the compressed image section, and generate a decompressed image section.

In some embodiments, the coding module 150 may be configured to perform pixel-by-pixel decompression of the input compressed image section based on the same sequential order that is used for compressing and generating the compressed image section. Specifically, the coding module may sequentially retrieve from the compressed image section one pixel per round of decompressing, starting from $p[0]$ and all the way to $p[N-1]$. Therefore, the above approach is suitable for stream-processing, the input image section may be implemented as a bitstream in the memory, and the coding module may retrieve and process the pixels as they become available in the bitstream.

In some embodiments, the coding module may perform its decompression operation based on a pixel $p[i]$'s compressed value $c[i]$, which may be a 4-bit value. The coding module may dynamically determine or switch coding modes when decoding the pixels. Specifically, the pixel $p[i]$ may be compressed using either $RAW\_C$ or $DIF\_C$ coding mode.

Thus, the coding module needs to know the specific coding mode the current p[i] was compressed with, in order to use this specific coding mode to decompress c[i].

In some embodiments, the coding module may determine whether the current pixel to be process is an initial pixel, and if so, the coding module may proceed to blocks 310 and 320 for generating and storing the decompressed initial pixel. Specifically, the coding module may decompress the initial pixel p[0] using RAW_C, since p[0] was originally compressed using RAW_C. During the decompressing of the initial pixel p[0], the coding module may further extract a coding mode M[1] from c[0], which is in a dedicated bit of the c[0].

In some embodiments, the initial c[0] may have 8 bits, with 7 bits dedicated for the storing of the compressed pixel value (or y[0]), and 1 bit dedicated for the storing of M[1] for the next pixel p[1]. The coding module may generate or retrieve a predict value y[0] based on the 7 bits, and retrieve the coding mode M[1] based on the 1 bit. The above operations may be shown by the following pseudo code:

y[0]=bit[0-6]*2, M[1]=bit[7]

In the above example code, the predict value y[0] may be generated based on the dedicated 7 bits in the c[0], and M[1] may be retrieved from the dedicated 1 bit in the c[0]. Afterward, y[0] and M[1] may then be transmitted to block 330 for subsequent decompressing of non-initial pixels.

In some embodiments, when the current pixel p[i] is not the initial pixel, the coding module may proceed to blocks 330 and 340 for pixel-by-pixel processing. Specifically, for each p[i], the coding module may dequantize c[i] and generate a predict value y[i] as the decompressed value of c[i], based on M[i] and y[i−1] (which were derived or generated when decompressing p[i−1] in the previous round/cycle of decompressing pixel). Further, the coding module may derive M[i+1] from c[i], M[i+1] being used for decompressing of the next pixel in the next cycle. For the last pixel, the coding module may extrapolate an additional pixel that is substantially the same as the last pixel, and treat the last pixel as have a next pixel fulfilled by the extrapolated pixel.

In some embodiments, the coding module may generate a corresponding quantize value q[i] and M[i+1], based on y[i−1] and M[i] that were available since the previous cycle of decompressing of p[i−1]. Specifically, the 4-bit c[i] may contain c[i] and encapsulated M[i+1]. The coding module may generate q[i] based on c[i], and determine whether c[i] containing escape values or not. If c[i] contains escape values, it may indicate a mode-change. Otherwise, it may indicate mode-sustaining. Therefore, based on M[i], mode-change, or mode-sustaining, the coding module may be able to derive M[i+1]. Afterward, the coding module may transmit y[i−1], q[i], M[i] and M[i+1] to block 340 for dequantization.

In some embodiments, at block 340, the coding module may generate a decompressed value y[i] by dequantization based on the y[i−1], q[i], M[i] and M[i+1] received from block 330 (and block 310 when processing p[1]). Specifically, when M[i] is DIF_C, indicating pixel p[i] is flat, the coding module may need to determine y[i] by first determining a difference between y[i−1] and q[i] based on M[i+1], and then apply the difference to the y[i−1] to generate y[i]. Afterward, the 8-bit y[i] may be deemed a decompressed pixel corresponding to the compressed p[i], and be stored in the decompressed image section.

Therefore, the above decompressing approach is fixed-rate decompression, as for a compressed image section having N pixels and 8+4*(N−1) bits, the decompressed pixels may have a fixed size of 8*N, in which the initial pixel takes 8 bits and the rest of pixels take 8 bits/pixel after decompression. Further, the above approach extracts the coding mode and mode-changing from the 4-bit compressed value, without dedicating 1 bit to store such mode information. Such an approach greatly reduced the resources required during compression/decompression process.

As shown above, two pixels p[i−1] and p[i] may be sufficient for the decompressing of p[i], and any intermediary values such as y[i−1], q[i], M[i], M[i+1] may be derived from x[i−1] and x[i]. Therefore, the coding module may at most retrieve x[i−1] and x[i] from the decompressed image section, without requiring to access any additional data from the image sections or image. The coding module may further utilize temporary memory (cache) to store these intermediary values for processing the current pixel, and reserve some of these intermediary values (e.g., y[i] and M[i+1]) for subsequent round of processing the next pixel p[i+1]. Thus, the memory footprint required by the coding mode can be small.

In some embodiments, the coding module may utilize lookup tables (LUTs) to store routine calculations, so that the performance of the coding module can be further optimized. For example, the coding module may access pre-stored decompression LUTs to look up parameters and precalculated values corresponding to p[i], and perform decompression of p[i] according to the corresponding parameters found in the decompression LUTs.

Figure 4:
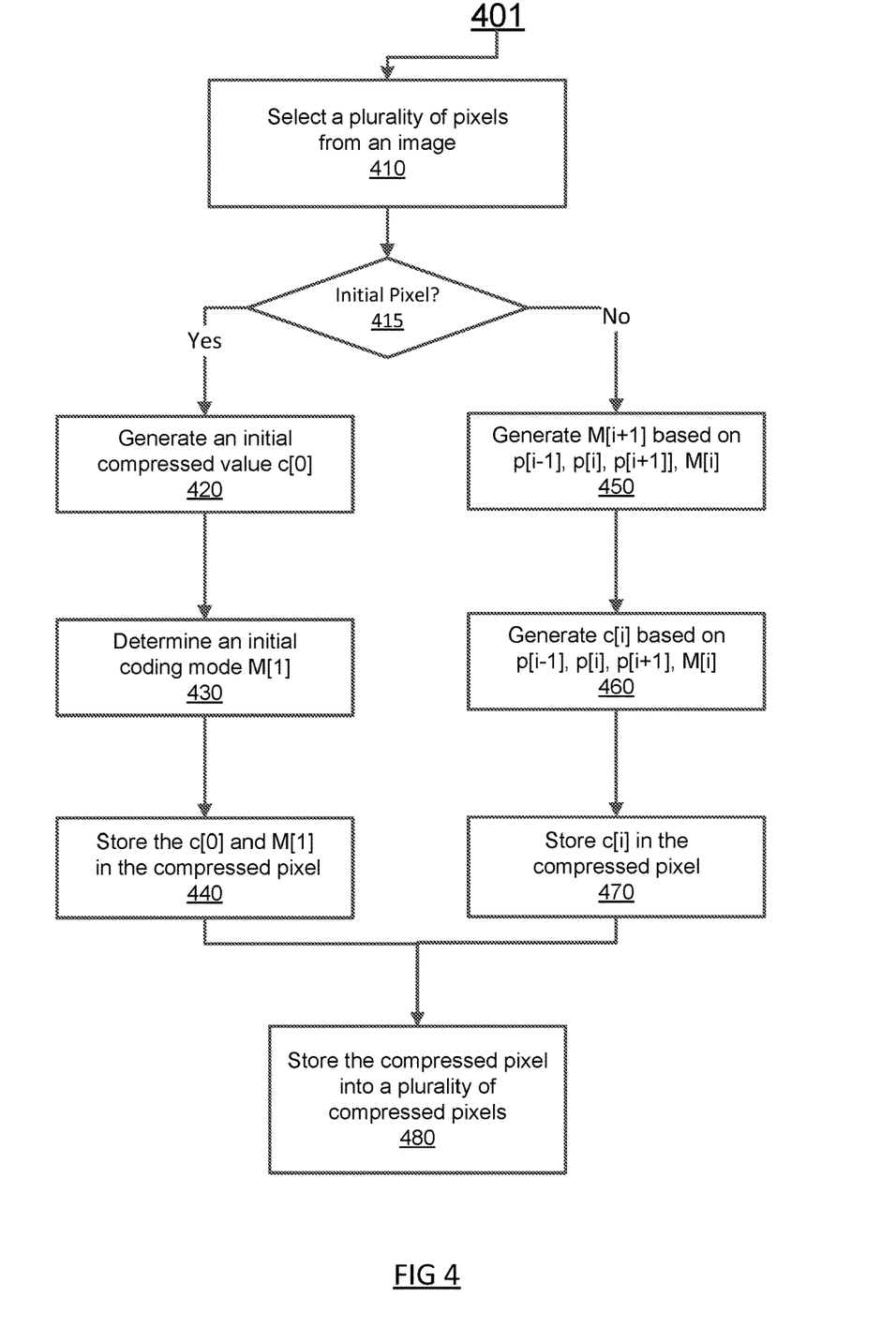
FIG. 4 shows a flow diagram illustrating a process for fixed-rate compression of an image, according to some embodiments of the present disclosure.

FIG. 4 shows a flow diagram illustrating a process for fixed-rate compression of an image, in accordance to certain embodiments of the present disclosure. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a coding module may select a plurality of pixels from an image. The plurality of pixels may have a sequential order, and for a current pixel p[i] in the plurality of pixels, it may have a previous pixel p[i−1] and a next pixel p[i+1] in the plurality of pixels based on the sequential order. The coding module may perform pixel-by-pixel compressing of the plurality of pixels to generate a plurality of compressed pixels.

At block 415, when performing pixel-by-pixel compressing of the plurality of pixels, the coding module may determine whether the current pixel is an initial pixel. If the current pixel is p[0], the process 401 may proceed to block 420. Otherwise, the process 401 may proceed to block 450.

At block 420, the coding module may generate an initial compressed value c[0] corresponding to the p[0] using a raw mode RAW_C. The c[0] may have an initial predefined fixed-rate of compression (e.g., 8-bit rate).

At block 430, the coding module may determine an initial coding mode M[1] for the subsequent round of compressing p[1]. The M[1] is generated based on p[0]'s predict value and p[1]'s raw value.

At block 440, the coding module may store the c[0] and M[1] in the compressed pixel. Specifically, the coding module may store the c[0] in some dedicated bits (e.g., bits 0-6) of the compressed pixel, and store the M[1] in a remaining dedicated bit (e.g. bit 7) of the compressed pixel. Afterward, the process 401 may proceed to block 480 for further processing.

At block 450, when the current pixel is not an initial pixel, the coding module may compress the current pixel by generating a code mode M[i+1] based on p[i−1], p[i] and/or p[i+1], and based on M[i] which was generated during a previous round of compressing of the p[i−1]. The coding module may utilize M[i+1] to compress p[i+1] during a subsequent round of compressing.

At block 460, the coding module may generate, using the coding mode M[i], a compressed value c[i] corresponding to the p[i] based on p[i−1], p[i], and/or p[i+1]. The c[i] may have a predefined fixed-rate of compression (e.g., 4-bit rate) that is different from the initial fixed-rate of compression used form compressing p[0].

At block 470, the coding module may store the c[i] in the compressed pixel. Further, the c[i] may encapsulate the M[i+1] with escaping values.

At block 480, the coding module may store the compressed pixel into the plurality of compressed pixels, and once all pixels in the plurality of pixels are processed, store the plurality of compressed pixels into a compressed image corresponding to the image.

Figure 5:
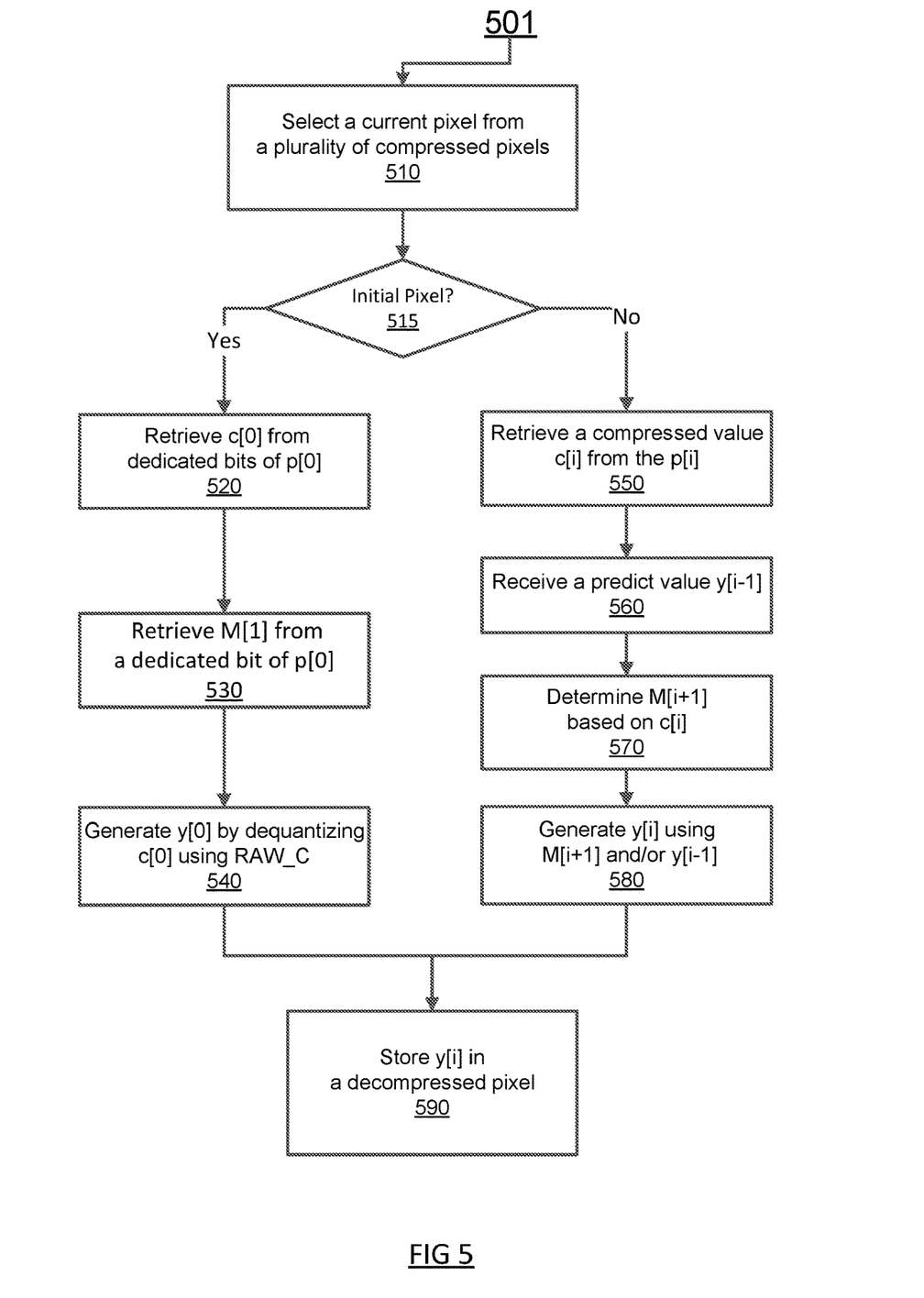
FIG. 5 a flowchart illustrating a process for fixed-rate decompression of a previously compressed image, according to some embodiments of the present disclosure.

FIG. 5 shows a flow diagram illustrating a process for fixed-rate decompression of a previously compressed image, according to certain embodiments of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, a coding module may select a current pixel from a plurality of pixels containing compressed values. The plurality of pixels may be extracted from a compressed image, and may have a sequential order. For a current pixel p[i] in the plurality of pixels, it may have a previous pixel p[i−1] and a next pixel p[i+1] in the plurality of pixels based on the sequential order. The coding module may perform pixel-by-pixel decompressing of the plurality of pixels to generate a plurality of decompressed pixels.

At block 515, when performing pixel-by-pixel decompressing of the plurality of pixels, the coding module may determine whether the current pixel is an initial pixel. If the current pixel is p[0], the process 501 may proceed to block 520. Otherwise, the process 501 may proceed to block 590.

At block 520, the coding module may retrieve an initial compressed value c[0] from some dedicated bits of the compressed pixel p[0].

At block 530, the coding module may retrieving an initial coding mode M[1] from a remaining dedicated bit of the compressed pixel p[0]. The M[1] may be configured for decompressing p[1] in a subsequent round of decompressing.

At block 540, the coding module may generate a predict value y[0] by dequantizing the c[0] using a raw mode RAW_C. The y[0] has a predefined fixed-rate of compression (e.g., 8-bit rate). Afterward, the process 501 may proceed to block 590.

At block 550, when the current pixel p[i] is not an initial pixel, the coding module may decompress the p[i] by retrieving a compressed value c[i] from the p[i].

At block 560, the coding module may receive a predict value y[i−1] which was, in a previous round of decompressing, generated by decompressing the p[i−1] using a coding mode M[i]. Note that M[i] may be encapsulated in p[i−1] and may be configured for compressing p[i].

At block 570, the coding module may determine a coding mode M[i+1] based on the c[i]. The M[i+1] may be encapsulated in p[i] and c[i] and may be configured for compressing the p[i+1]. In some embodiments, when the c[i] is one of a set of predefined escape values for mode-changing, the coding module may assign the M[i+1] to be different from M[i]. In other words, when M[i] is RAWC, M[i+1] may be assigned to DIF_C; and when M[i] is DIF_C, M[i+1] may be assigned to RAW_C. Alternatively, when the c[i] is not one of the set of predefined escape values for mode-changing, it may indicate mode-sustaining. In this case, the coding module may assign the M[i+1] to be the same as M[i]. In other words, when M[i] is RAW_C, M[i+1] may be assigned to RAW_C; and when M[i] is DIF_C, M[i+1] may be assigned to DIF_C.

At block 580, the coding module may use the M[i] to generate a current predict value y[i] corresponding to the p[i] based on the y[i−1]. The y[i] may have a predefined fixed-rate of compression that is different from the initial fixed-rate of compression for compressing p[0]. The coding module may store the M[+1] in cache to allow the decompressing of p[i+1] during a subsequent round of pixel processing.

At block 590, the coding module may store the predict value y[i] in the decompressed pixel, and store the decompressed pixel into a decompressed image corresponding to the compressed image.

Figure 6:
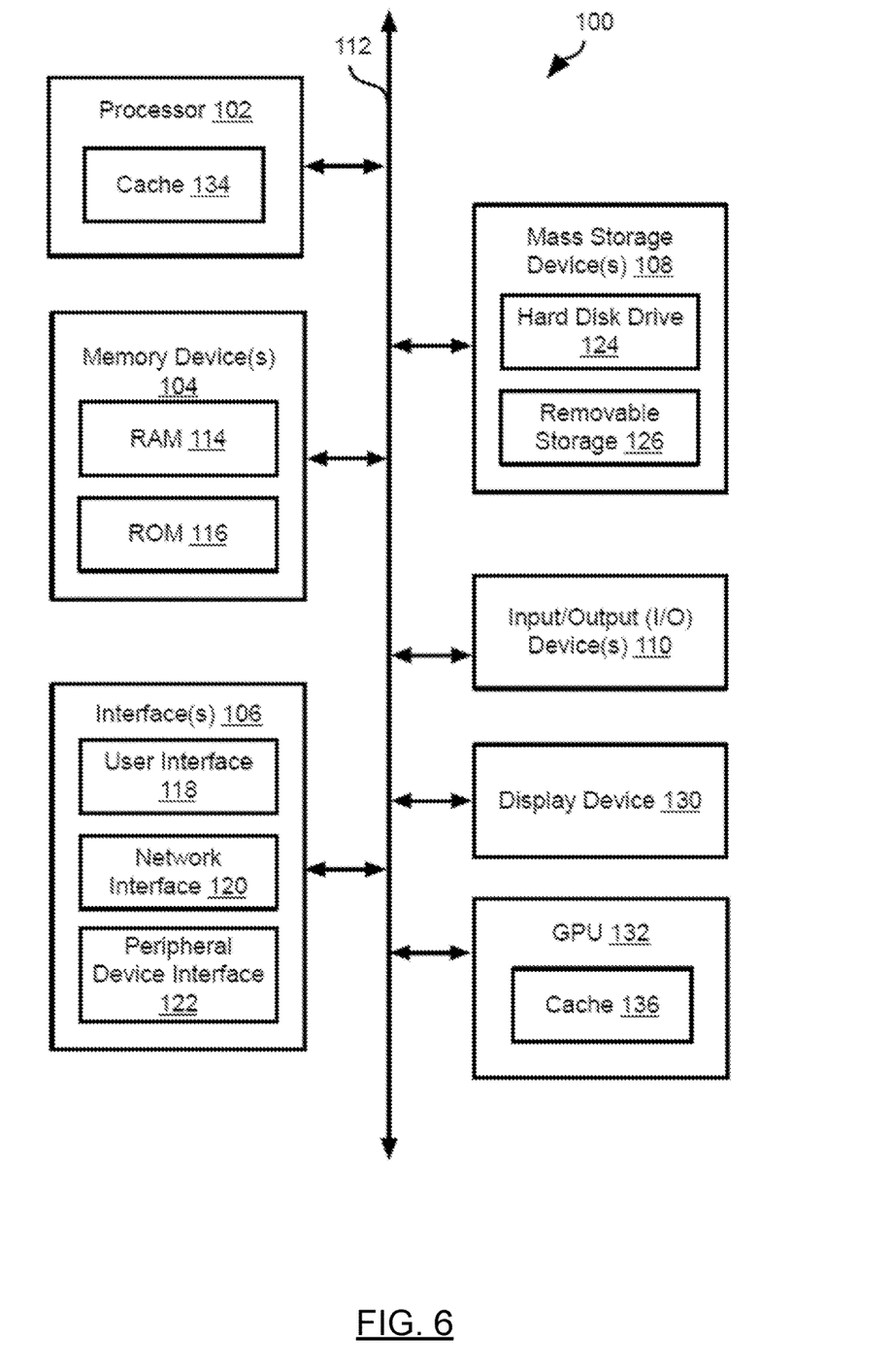
FIG. 6 is a system diagram illustrating a hardware image processing device that can be used to implement a coding module, according to some embodiments of the present disclosure.

FIG. 6 is a diagram illustrating a hardware image processing device 100 that can be used to implement the coding module 150. The device 100 may be used to perform various procedures, such as those discussed herein. The device 100 may function as a server, a client, or any other computing entity, may perform various coding and decoding functions as discussed herein, and may execute one or more application programs, such as the application programs described herein. The device 100 can also be any of a wide variety of computing devices, such as a desktop computer, a notebook computer, a server computer, a handheld computer, tablet computer and the like.

In some embodiments, the device 100 may include one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

In some embodiments, memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory. Mass storage device(s) 108 include various computer readable media, such as magnetic tapes, magnetic disks, optical disks, solid-state memory (e.g., Flash memory), and so forth. A particular mass storage device may be a hard disk drive 124. Various drives may also be included in mass storage device(s) 108 to enable reading from and/or writing to the various computer readable media. Mass storage device(s) 108 include removable media 126 and/or non-removable media.

In some embodiments, I/O device(s) 110 include various devices that allow data and/or other information to be input to or retrieved from the device 100. Example I/O device(s) 110 include cursor control devices, keyboards, keypads, microphones, monitors or other display devices, speakers, printers, network interface cards, modems, lenses, CCDs or other image capture devices, and the like. Display device 130 includes any type of device capable of displaying information to one or more users of the device 100. Examples of display device 130 include a monitor, display terminal, video projection device, and the like.

In some embodiments, a graphics-processing unit (GPU) 132 may be coupled to the processor(s) 102 and/or to the display device 130. The GPU may be operable to render computer generated images and perform other graphical processing. The GPU may include a plurality of subunits that is able to perform parallel processing of pixels of an image. The GPU may include some or all of the functionality of a general-purpose processor, such as the processor(s) 102. The GPU may also include additional functionality specific to graphics processing. The GPU may include hard-coded and/or hard-wired graphics functions related to coordinate transformation, shading, texturing, rasterization, and other functions helpful in rendering a computer-generated image. In some embodiments, the device 100 may include multiple GPUs, which are configured to perform compression or decompression of multiple image sections in parallel.

In some embodiments, interface(s) 106 include various interfaces that allow the device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

In some embodiments, bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In some embodiments, a processor 102 may include a cache 134, such as one or both of a L1 cache and an L2 cache. A GPU 132 may likewise include a cache 136 that may likewise include one or both of a L1 cache and an L2 cache. In some embodiments, the processor 102 is a special-purpose processor 102 designed for the image processing method of the present disclosure. The above caches may be used to store compression LUTs and/or the decompression LUTs.

In some embodiments, the coding module of the present disclosure may be implemented by the processor 102 or the GPU 132. Alternatively, the coding module may be a hardware module that connected via bus 112 to the processor 102 and GPU 132. During operation, the coding module may invoke the processing functionalities provided by the processor 102 and GPU 132, and may access the memory or cache for its operations.

In some embodiments, the coding module may compress/decompress image data being transmitted via the bus 112. The compressed image data will take less space in memory and cache, and has a much smaller read/write footprint, and utilize less bandwidth when being transmitted in the device.

In some embodiments, the device may receive input images captured by an AI vision device (not shown in FIG. 6), and transmit the compressed image to the AI vision device. The AI vision device may apply or further process the compressed image for object detection, anomaly detection, or monitoring, sending alters, or analytics. The AI vision device is any device that replicates the human vision system, it is capable of one or more of image segmentation, object detection, facial recognition, edge detection, pattern recognition, image classification, and it may include one or more of a smart phone, vehicle, cashier-less checkout machine, PC, medical equipment, smart traffic light, VR headset, etc. The AI vision device may be an edge device, an on-premise server, or a cloud computing server.

One or more embodiments of the present disclosure may be implemented as one or more computer programs or as one or more computer program modules embodied in one or more computer readable media, when being executed by a processor, causing the computer programs to perform these embodiments. The term computer readable storage medium refers to any non-transitory data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Systems and methods for visual lossless fixed-rate image compression have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A data compression method for compressing an image, comprising:
   selecting, by a coding module, a plurality of pixels from the image, wherein the plurality of pixels have a sequential order;
   compressing, by the coding module, the plurality of pixels and generating a plurality of compressed pixels, wherein for a current pixel p[i] that has a previous pixel p[i−1] and a next pixel p[i+1] in the plurality of pixels based on the sequential order, the coding module
   generates, using a first coding mode M[i] generated during compressing of the p[i−1], a second coding mode M[i+1] based on the p[i−1], the p[i] and/or the p[i+1], wherein the M[i+1] is configured for compressing the p[i+1],
   generate, using the M[i], a compressed value c[i] corresponding to the p[i] based on the p[i−1], the p[i], and/or the p[i+1], wherein the c[i] has a first predefined fixed-rate of compression, and
   storing the c[i] in the compressed pixel, wherein the c[i] encapsulates the second coding mode M[i+1]; and
   storing, by the coding module, the plurality of compressed pixels into a compressed image corresponding to the image.

2. The data compression method according to claim 1, wherein
   for an initial pixel p[0] and a next pixel p[1] in the plurality of pixels, the coding module generates the compressed pixel corresponding to the p[0] by
   generating an initial compressed value c[0] by compressing the p[0] using a raw mode RAW_C, wherein the c[0] has a second predefined fixed-rate of compression that is different from the first predefined fixed rate of compression,
   determining, based on p[0]'s predict value and p[1]'s raw value, an initial coding mode M[1] for compressing p[1],
   storing the c[0] in some dedicated bits of the compressed pixel, and
   storing the M[1] in a remaining dedicated bit of the compressed pixel.

3. The data compression method according to claim 1, wherein the coding module generates the M[i+1] by
   determining the M[i+1] based on p[i]'s raw value, p[i]'s predict value, p[i+1]'s raw value, and/or p[i+1]'s predict value, without storing the M[i+1] into any dedicated bits in the compressed pixel.

4. The data compression method according to claim 1, wherein
   the M[i] or the M[i+1] is either a raw mode RAW_C or a differential mode DIF_C;
   under the RAW_C, the coding module compresses the p[i] using p[i]'s raw value; and
   under the DIF_C, the coding module compresses the p[i] using a differential value between p[i]'s raw value and p[i−1]'s predict value.

5. The data compression method according to claim 4, wherein generating the second coding mode M[i+1] comprises:
   when the M[i] is in the RAW_C and the p[i] is deemed in a busy area in the image, setting the M[i+1] to be the RAW_C;
   when the M[i] is in the RAW_C and the p[i] is deemed in a flat area of the image,
      calculating a first mode-changing cost and a first mode-sustaining cost associated with the p[i+1],
      setting the M[i+1] to be the RAW_C when the first mode-changing cost is not smaller than the first mode-sustaining cost, and
      setting the M[i+1] to be the DIF_C when the first mode-changing cost is smaller than the first mode-sustaining cost; and
   when the M[i] is in the DIF_C,
      calculating a second mode-changing cost and a second mode-sustaining cost associated with the p[i+1],
      setting the M[i+1] to be the DIF_C when the second mode-changing cost is not smaller than the second mode-sustaining cost, and
      setting the M[i+1] to be the RAW_C when the second mode-changing cost is smaller than the second mode-sustaining cost.

6. The data compression method according to claim 5, wherein when the M[i] is in the RAW_C, p[i] is deemed in the flat area when p[i]'s predict value is substantially equal to p[i−1]'s predict value.

7. The data compression method according to claim 5, wherein when the M[i] is in the DIF_C, the second mode-changing cost is calculated based on the p[i+1]'s raw value and p[i]'s predict value, and the second mode-sustaining cost is calculated based on the p[i+1]'s raw value.

8. The data compression method according to claim 5, wherein when the M[i] is in the DIF_C and the second mode-changing cost is smaller than the second mode-sustaining cost, generating the compressed value c[i] comprises:
   calculating the c[i] based on an adjusted approximated difference between p[i]'s raw value and p[i−1]'s predict value; and
   assigning the c[i] as an escape value for mode-changing.

9. The data compression method according to claim 5, wherein when the M[i] is in the DIF_C and the second mode-changing cost is not smaller than the second mode-sustaining cost, generating the compressed value c[i] comprises:
   calculating the c[i] based on an adjusted approximated difference between p[i]'s raw value and p[i−1]'s predict value;
   assigning the c[i] for indicating mode-sustaining.

10. The data compression method according to claim 4, wherein the coding module encapsulate the second coding mode M[i+1] into the compressed pixel by,
   for a set of available values for storing in the compressed pixel,
      assigning a first subset of the available values as mode-sustaining, and
      assigning a second subset of the available values as a set of escape values for mode-changing.

11. A data decompressing method for decompressing a compressed image, comprising:

selecting, by a coding module, a current pixel p[i] from a plurality of pixels in the compressed image, wherein the current pixel p[i] has a previous pixel p[i−1] and a next pixel p[i+1] based on a sequential order in the plurality of pixels;

decompressing, by the coding module, the p[i] and generating a decompressed pixel by retrieving a compressed value c[i] from the p[i];

receiving a previous predict value y[i−1] generated by decompressing the p[i−1] using a first coding mode M[i];

determining a second coding mode M[i+1] based on the c[i], wherein the second coding mode M[i+1] is configured for decompressing the p[i], generating, using the M[i], a current predict value y[i] corresponding to the p[i] based on the y[i−1], wherein the y[i] has a first predefined fixed-rate of compression, and storing the y[i] in the decompressed pixel; and storing, by the decoding module, the decompressed pixel into a decompressed image corresponding to the compressed image.

12. The data decompressing method according to claim 11, wherein for an initial pixel p[0] and a next pixel p[1] from the plurality of pixels, the coding module decompress the p[0] by retrieving, from some dedicated bits of the p[0], an initial compressed value c[0] from p[0];

retrieving, from a remaining dedicated bit of the p[0], an initial coding mode M[1] configured for decompressing p[1];

generating a predict value y[0] by dequantizing the c[0] using a raw mode RAW_C, wherein the y[0] has a second predefined fixed-rate of compression that is different from the first predefined fixed rate of compression; and storing the y[0] in the decompressed pixel.

13. The data decompressing method according to claim 11, wherein the M[i] or the M[i+1] is either a raw mode RAW_C or a differential mode DIF_C;

under the RAW_C, the coding module decompresses the p[i] using c[i]; and under the DIF_C, the coding module decompresses the p[i] using a differential value between c[i] and y[i−1].

14. The data decompressing method according to claim 11, wherein determining the M[i+1] from the c[i] comprises:

when the c[i] is one of a set of predefined escape values for mode-changing, assigning the M[i+1] to be different from M[i].

15. The data decompressing method according to claim 11, wherein determining the M[i+1] from the c[i] comprises:

when the c[i] is not one of a set of predefined escape values for mode-changing, assigning the M[i+1] to be the same as M[i].

16. An image coding system for image compressing/decompressing, comprising:

a memory cache for storing a plurality of input pixels and a plurality of output pixels corresponding to the plurality of input pixels, wherein the plurality of input pixels have a sequential order; and a coding module coupled with the memory cache, wherein when compressing the plurality of input pixels to generate the plurality of output pixels, for a current pixel p[i] that has a previous pixel p[i−1] and a next pixel p[i+1] in the plurality of pixels based on the sequential order, the coding module is configured to generate, using a first coding mode M[i] generated during compressing of the p[i−1], a second coding mode M[i+1] based on the p[i−1], the p[i] and/or the p[i+1], wherein the second coding mode M[i+1] is configured for compressing the p[i+1], generate, using the first coding mode M[i], a compressed value c[i] corresponding to the p[i] based on the p[i−1], the p[i], and/or the p[i+1], wherein the c[i] has a first predefined fixed-rate of compression, and store the c[i] in the compressed pixel, wherein the c[i] encapsulates the second coding mode M[i+1], and store the compressed pixel into the plurality of output pixels.

17. The image coding system according to claim 16, wherein when decompressing the plurality of input pixels to generate the plurality of output pixels, the coding module is configured to retrieve a compressed value c[i] from the p[i];

receive a previous predict value y[i−1] generated by decompressing the p[i−1] using a third coding mode M[i];

determine a fourth coding mode M[i+1] based on the c[i], wherein the fourth coding mode M[i+1] is configured for decompressing the p[i], generate, using the fourth coding mode M[i], a current predict value y[i] corresponding to the p[i] based on the y[i−1], wherein the y[i] has the first predefined fixed-rate of compression, and storing the y[i] in a decompressed pixel; and storing the decompressed pixel into the plurality of output pixels.

18. The image coding system according to claim 16, further comprising:

a lookup table (LUT) stored in the memory cache, wherein the coding module is configured to use the LUT to generate the M[i+1] based on the M[i].

19. The image coding system according to claim 16, wherein the plurality of input pixels are stored in the memory cache as a bitstream, and the coding module retrieves the p[i−1], the p[i], and/or the p[i+1] from the bitstream.

20. The image coding system according to claim 16, further comprising:

a plurality of GPUs each of which is configured to operate as the coding module, wherein the image coding system is configured to divide an image into multiple input image sections, wherein each of the input image sections containing a corresponding plurality of input pixels, assign each of the plurality of GPUs to simultaneously process a corresponding one of the input image sections and generate a corresponding output image section, and combining the output image sections generated by the plurality of GPUs to generate an output image in response to the input image.

* * * * *